US012588655B2

(12) United States Patent　　　　(10) Patent No.:　US 12,588,655 B2

Galinsky　　　　　　　　　　　　　(45) **Date of Patent:　*Mar. 31, 2026**

---

(54) CAT TOWER FEEDING TRAY

(71) Applicant: Traci L Galinsky, Cincinnati, OH (US)

(72) Inventor: Traci L Galinsky, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,488

(22) Filed: Jul. 19, 2024

(65) Prior Publication Data

US 2024/0373818 A1　　　Nov. 14, 2024

Related U.S. Application Data

(63) Continuation of application No. 17/972,064, filed on Oct. 24, 2022, now Pat. No. 12,070,019.

(60) Provisional application No. 63/320,979, filed on Mar. 17, 2022.

(51) Int. Cl.
　　*A01K 5/01*　　　　　(2006.01)

(52) U.S. Cl.
　　CPC .................................. *A01K 5/0114* (2013.01)

(58) Field of Classification Search
　　CPC .. A01K 5/0114; A01K 15/027; A01K 15/024;
　　　　　　　　　　　　　　A01K 1/0356; A01K 1/035
　　See application file for complete search history.

(56) References Cited

U.S. PATENT DOCUMENTS

| | | | | |
|---|---|---|---|---|
| 3,143,374 | A * | 8/1964 | Corboni | A47D 1/008 248/117.7 |
| D289,570 | S * | 4/1987 | Hageney | D30/133 |
| 5,148,561 | A * | 9/1992 | Tharalson | A47C 19/22 5/99.1 |
| 6,370,715 | B1 * | 4/2002 | Morton | A47D 9/016 5/99.1 |
| 6,546,575 | B2 * | 4/2003 | DeAngelo | A47D 9/016 5/655 |
| RE40,754 | E * | 6/2009 | Morton | A47D 7/002 5/99.1 |
| 8,230,818 | B2 * | 7/2012 | Pietra | A01K 1/0353 119/485 |
| D669,231 | S * | 10/2012 | Chance | D30/131 |
| 11,147,236 | B1 * | 10/2021 | Willis | A47C 21/00 |
| 12,029,196 | B1 * | 7/2024 | Chung | A01K 1/0353 |
| 2016/0088815 | A1 * | 3/2016 | Maroske | A01K 15/024 119/51.01 |
| 2016/0255803 | A1 * | 9/2016 | Baranoff | A01K 1/0353 |
| 2022/0330519 | A1 * | 10/2022 | Chitkowski | F16M 11/38 |

FOREIGN PATENT DOCUMENTS

| | | | | |
|---|---|---|---|---|
| AT | | 505917 A4 * | 5/2009 | A61B 5/1072 |

* cited by examiner

*Primary Examiner* — Ebony E Evans

(57)　　　　　　　　ABSTRACT

A cat tower feeding tray that can easily be removed when not in use. The cat tower feeding tray can be used with various sized and shaped food and water bowls. The cat tower feeding tray allows cats to be fed above the ground away from other animals or small children, which prevents unexpected messes and protects the other animals and small children from foods that may be harmful to them if ingested. In addition, the cat tower feeding tray allows cat owners with limited bending ability to feed their cat without the need to bend down to place the food.

18 Claims, 8 Drawing Sheets

144
146
147
148
150
152

154
156
158
161
160

CAT TOWER FEEDING TRAY

CROSS REFERENCE TO RELATED APPLICATION

This patent application is a continuation of U.S. patent application Ser. No. 17/972,064, filed on Oct. 24, 2022, which claims the benefit of U.S. Provisional Patent Application Ser. No. 63/320,979, filed on Mar. 17, 2022, and entitled "CAT TOWER FEEDING TRAY", the disclosures of which are hereby incorporated by reference herein in their entireties and made part of the present U.S. utility patent application for all purposes.

FIELD

The disclosed technology pertains to a tray that can attach to a cat tower for feeding cats.

BACKGROUND

Cat towers come in various layouts and designs. Typically, cat towers have multiple levels for cats to climb and traverse. A minute number of towers have round holes where one or two bowls can be inserted to place food and water for cats to feed. In such towers, when the bowls are removed from the tower, awkward holes remain, and cats are unable to traverse these holes as they are typically too small for cats to get through. Thus, when the bowls are removed, the holes serve no function. Furthermore, most cat towers are not made to allow cats to eat and/or drink from the tower.

Mountable wall shelves exist that allow cats to feed high off the floor. Typically, the shelves have round holes where food and water bowls can be inserted. Unfortunately, these holes only allow for a specific-sized bowl to be used. Therefore, the shelves limit the bowls that can be used and require cat owners to purchase new bowls specifically to use with the tray. Instead of holes to insert food and water bowls, some wall shelves have raised sides that allow any sized bowl to be placed on the shelves without the bowls falling off. However, all types of wall-mounted shelves share the same problem, the shelves must be mounted to a wall using screws, thereby putting permanent holes in the wall, or mounted by other destructive means such as strong adhesives that might damage the paint and/or wall. Furthermore, the shelves cannot be easily removed.

What is needed, therefore, is a tray for a cat tower that allows cats to drink or feed high from the floor without the need to use specific-sized bowls, and which tray can be easily removed whenever the cat owner desires.

BRIEF DESCRIPTION OF THE DRAWINGS

The drawings and detailed description that follow are intended to be merely illustrative and are not intended to limit the scope of the invention as contemplated by the inventor.

DETAILED DESCRIPTION

The inventor has conceived of novel technology that, for the purpose of illustration, is disclosed herein as applied in the context of cat feeding trays. While the disclosed application of the inventor's technology satisfies a long-felt but unmet need in the art of cat towers, it should be understood that the inventor's technology is not limited to being implemented in the precise manners set forth herein but could be implemented in other manners without undue experimentation by those of ordinary skill in the art in light of this disclosure. Accordingly, the examples set forth herein should be understood as being illustrative only and should not be treated as limiting.

The present implementation allows cats or other animals using an activity tree or tower to eat or drink high above ground level, away from other animals or small children. This allows the animal feeding from the tower to eat said animal's own food and keeps the food, which may be harmful to other animals or children, away from the other animals or children. In addition, the height of the feeding tray on the tower allows animal owners, who may have problems bending down, to serve their animal said animal's food without the owner needing to bend over to place the food on the floor.

The present implementation allows pet owners to feed their cats or other animals above ground level without the necessity of mounting shelves to walls and prevents permanent damage to walls. The cat feeding tray easily mounts to a platform on an activity tree or tower, which tray functions similarly to the wall-mounted shelves but does not permanently damage walls or the tower on which it is placed. In addition, since some implementations of the feeding tray provide a flat, smooth surface to place items, such as bowls, and do not have holes in which bowls are placed, bowls of various sizes and shapes can be placed on the feeding tray. Moreover, many cat towers can easily be converted to cat towers with feeding capabilities by using the feeding tray. Implementations of the disclosed tray can be removed without leaving awkward holes like the towers with holes for built-in feeding bowls. The feeding tray also allows full use of the tower while the feeding tray is attached and after removal of the feeding tray. Additionally, the feeding tray can be used by a cat owner that has multiple cat towers, and the feeding tray can be used on a new cat tower purchased by a cat's owner if the owner chooses to switch cat towers. Some implementations of the cat feeding tray may also have an additional short side wall to further prevent spills. The additional short side wall is placed onto the front (front being the side from which the cat would approach the tray to eat or drink) of the feeding tray.

Figure 1:
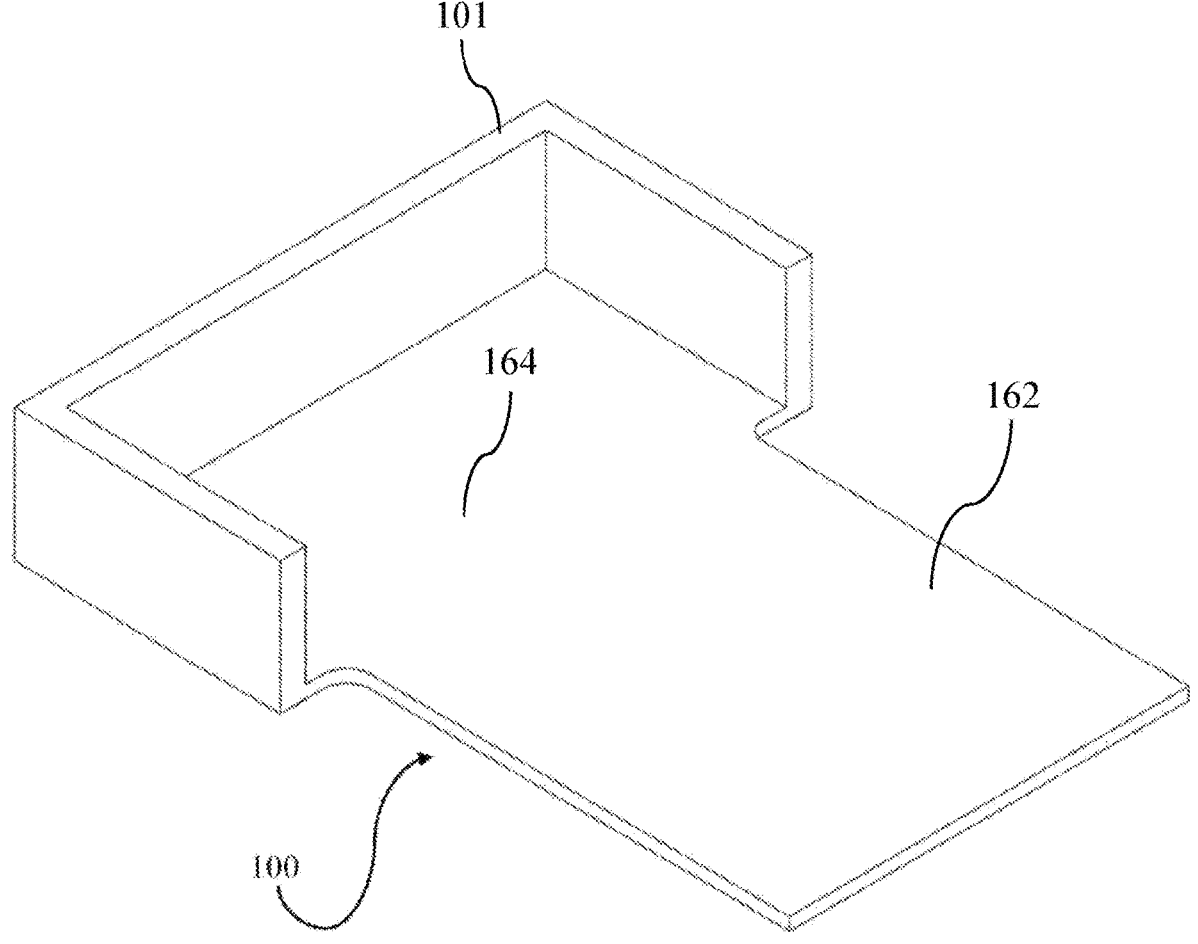
FIG. 1 is a top perspective view of a cat tower feeding tray.

Turning now to the figures, FIG. 1 shows a drawing of one implementation of a cat tower feeding tray. The feeding tray (100) is comprised of a tray portion (164) on which bowls may be placed and a base portion (162) that rests on or couples to a corresponding platform of a cat tree, the two portions (164 and 162, respectively) having a total of eight sides which are illustrated as including straight edges and curved edges, though variations may include only straight lines or only curved lines. The tray portion (164) and base portion (162) may be separate portions that are coupled together along a common edge, or may be manufactured as a single unibody structure. As illustrated, the tray portion (164) may be wider than the base portion (162) to provide sufficient area on which bowls may be placed, while also allowing the base portion (162) to fit on or couple to cat tree platforms of varying size. In varying implementations, the tray portion (164) may be between about one inch wider to about 12 inches wider than the base portion (162), as may be varied based upon a particular platform of a cat tree that the tray (100) will be placed upon.

Alternatively, the cat tower feeding tray (100) may be comprised of two rectangular bodies for the tray portion (164) and base portion (162). Alternatively, the base portion (162) could also be in the shape of a square, circle, oval, triangle, pentagon, octagon, or an irregular shape. The shape and dimensions of the base portion (162) may vary based on the size and shape of the platforms of conventional cat towers, which typically are square, rectangular, or round and typically vary in size from eight to twenty-one inches in width or diameter. The base portion (162) of the feeding tray provides an area for the cat to sit or lay while feeding from bowls located on the wider tray portion (164).

As shown in FIG. 1, three sides of the tray portion (164) of the feeding tray are comprised of a sidewall (101) that partially encloses the tray portion (164) of the feeding tray. Each section of the sidewall (101) is rectangular shaped having a top end and a bottom end of varying height, with varying implementations having a height between about one inch to about six inches. Where the tray portion (164) is a circular or oval shape, the sidewall (101) could be one continuous section that curves around the edge of the tray portion (164). The sidewall (101) prevents food and water dishes from falling or being knocked off the feeding tray (100). As illustrated, the tray portion (164) does not include any holes or slots to place bowls into, which allows for various size and shape food and water dishes to fit on the feeding tray.

The base portion (162), tray portion (164), and the sidewall (101) of the feeding tray could be made with various materials, such as wood (e.g., light-weight wood, plywood, hardwood, and softwood), bamboo, plastic, polycarbonate, and metal.

Figure 2:
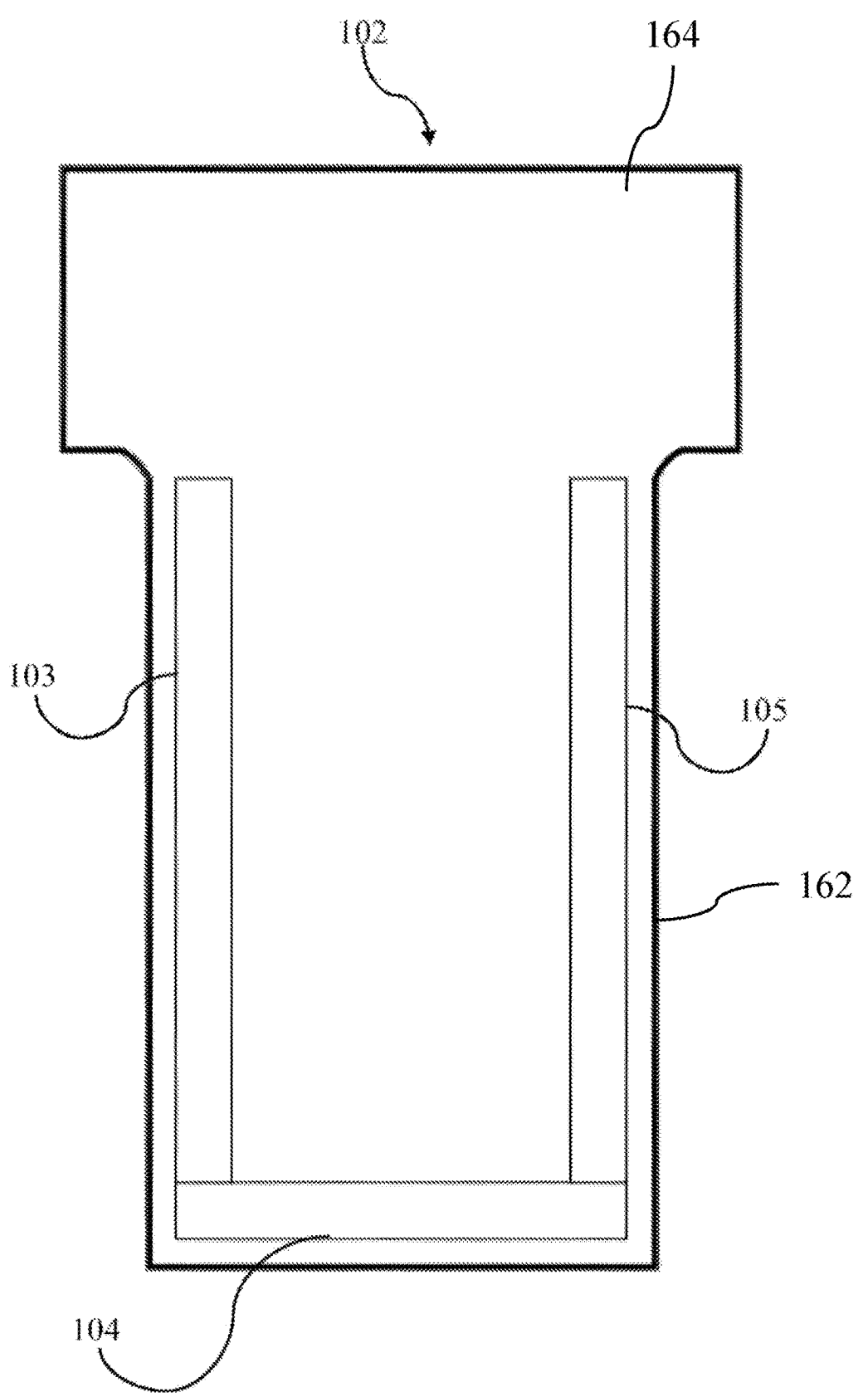
FIG. 2 is a bottom perspective view of the cat tower feeding tray.

Turning now to FIG. 2, that figure shows a drawing of the cat tower feeding tray (100) from a bottom perspective view (102). The bottom base portion (162) of the feeding tray (100) has three fastening strips (103, 104, 105) which may be, for example, strips of loop adhesive strip from hook and loop adhesive tape, with the adhesive side of the strips attached to the feeding tray (100), for securing the base portion (162) of feeding tray (100) to a set of corresponding fastener strips or a surface configured to couple to the fastener strips (e.g., a fabric surface to which hook and loop fasteners may couple to, a smooth surface to which adhesive fasteners may couple to) on a horizontal platform of the cat tower, such as the platform (147) illustrated by dashed lines in FIG. 7A. However, any number of strips of loop adhesive tape, strip fasteners, or other fasteners can be placed anywhere on the second rectangular base portion (162) of the bottom of the feeding tray (100) to secure the tray (100) to the platform (147) of the cat tower. The three loop adhesive strips (103, 104, 105) attached to the bottom of the feeding tray (100) have corresponding hook adhesive strips from hook and loop adhesive tape placed on the platform of the cat tower (147), which when the hook and loop portions of the hook and loop adhesive tape are put together, secures the tray in place. The hook and loop adhesive strips allow the tray to be easily removed and reattached as needed, thereby the tray is not permanently affixed to the cat tower. Alternatively, the tray could be affixed to the platform of a cat tower by other means, such as nut and bolt, other mechanical fasteners, a clip, or a clamp. In addition, a weight (e.g., either a counterweight, or the weight of the cat itself, where a combined center of gravity of the cat and the tray is maintained over and fully supported by the platform (147) throughout use) can be placed near the edge of the base portion (162) distal from the tray portion (164) (e.g., near the second loop adhesive strip (104)), to provide additional support to prevent the feeding tray from tipping.

Figure 3A:
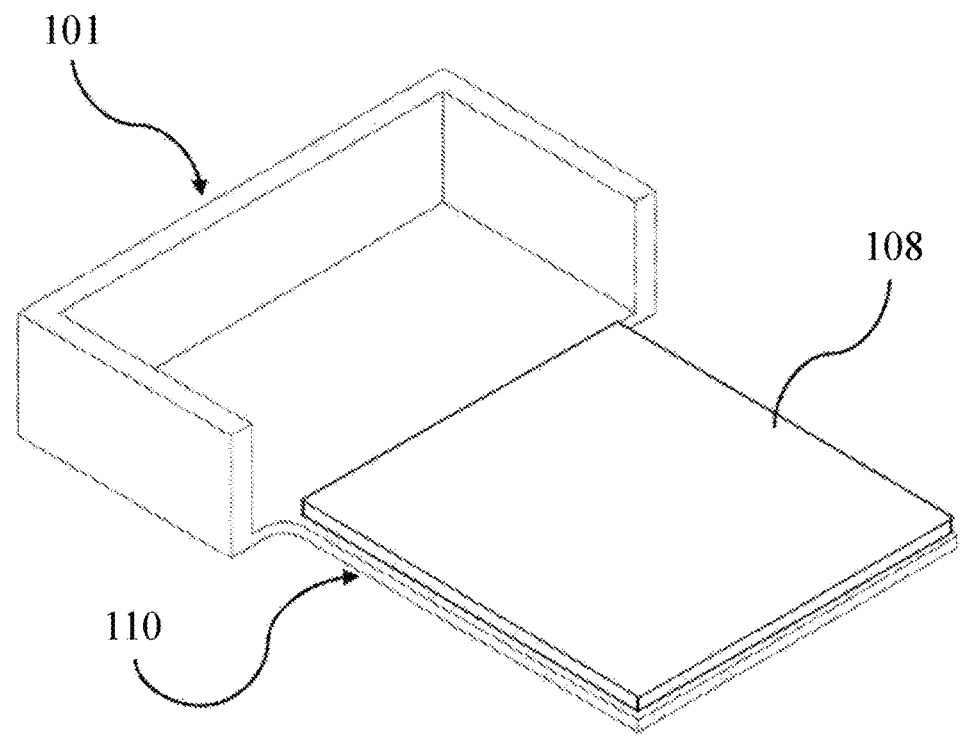
FIG. 3A is a perspective view of the cat tower feeding tray and pillow assembled.
Figure 3B:
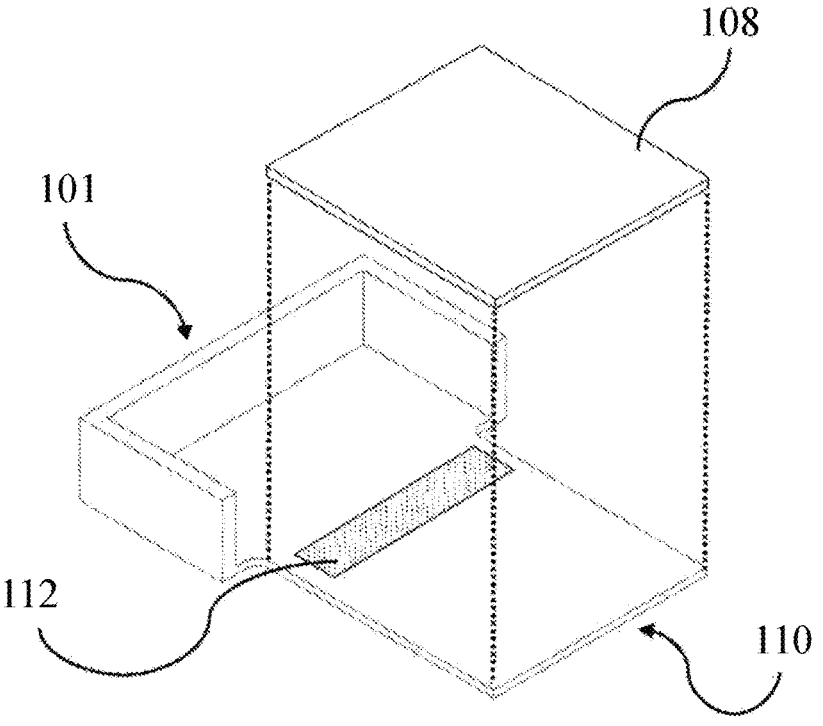
FIG. 3B is a perspective view of the cat tower feeding tray with pillow removed.

Additional features exist and may be included in varying implementations of the tray. For example, as shown in the implementation of FIG. 3A and FIG. 3B the tray (100) may include a cushion or pillow (108) cover for the base portion (162) of the feeding tray (100). The feeding tray (100) has an optional strip of the hook adhesive strip from a hook and loop adhesive tape (112) for securing a pillow or cushion (108) with the bottom of said pillow or cushion having a felt material or other fabric-like material that adheres to the hook portion of hook and loop adhesive tape (112). Alternatively, the top surface of the feeding tray (100) may be secured to the bottom surface of said pillow or cushion (108) using corresponding strips of hook and loop adhesive tape. The top of the pillow or cushion (108) could be made of any soft material, such as cotton, velvet, wool, faux fur, leather, faux leather, recycled material, or linen. The pillow cushion (108) can be anywhere from one to three inches thick. The pillow cushion (108) can be in the shape of a square, circle, oval, triangle, pentagon, octagon, or an irregular shape as may be varied based upon the size and shape of the base portion (162). The pillow cushion (108) can match the shape of the feeding tray (100) base portion (162), but it is not required to be in the same shape as the feeding tray (100) base portion (162). The pillow or cushion (108) increases the cat's comfort whether feeding from the tray (100) or just lounging on the platform (147). When the tray (100) is not affixed to the cat tower platform (147), the pillow or cushion (108) can be placed directly on the hook adhesive strips (112) on the platform (147) to enhance comfort.

Figures 3C, 3D:
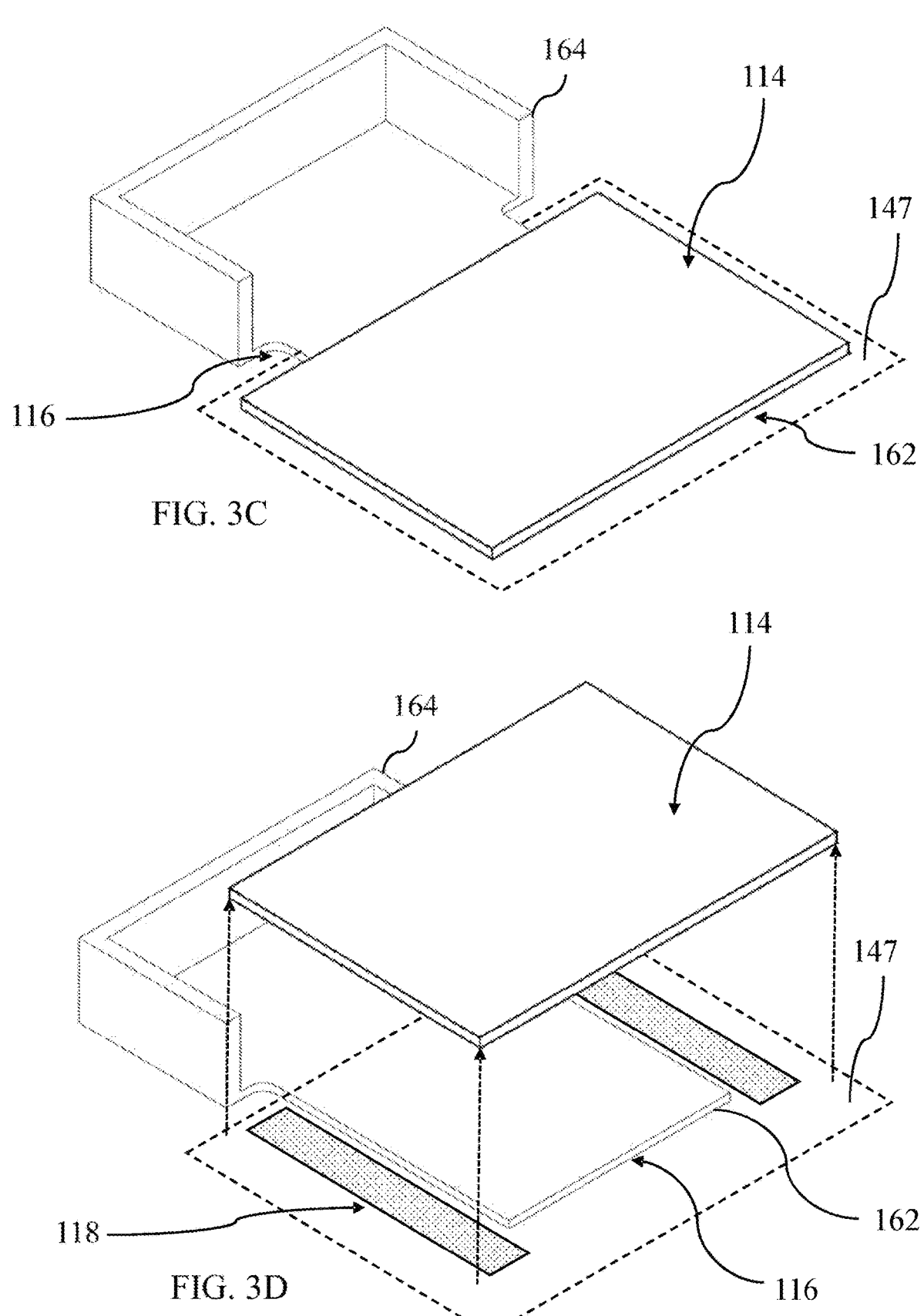
FIG. 3C is a perspective view of the cat tower feeding tray with the pillow assembled to secure the cat tower feeding tray to a cat tower platform.
FIG. 3D is a perspective view of the cat tower feeding tray with the pillow removed from the cat tower platform.

Alternatively, as shown in FIG. 3C and FIG. 3D, an optional pillow cushion (114) may be made wider than the base portion (162) of the feeding tray (100). In this implementation, along the outer edges of the two lateral sides of the cat tree/tower platform (147) are optional strips of the hook adhesive strip from a hook and loop adhesive tape (118) (e.g., or other strip fastener, 2-sided tape, mechanical fastener, or other coupling) for securing the pillow or cushion (114) with the bottom of said pillow or cushion (114) having a felt material or other fabric-like material that adheres to the hook portion of hook and loop adhesive tape (118). This implementation allows the feeding tray (100) to be easily slid in and out of place on the cat tree/tower, while the pillow (114) stays in place coupled to the cat tree platform (147). This is advantageous because it keeps the feeding tray (100) free of adhesive, allows the cat owner to easily remove the tray (100) for regular cleaning, and allows the cat owner to easily swap tray shapes and sizes with minimal disturbance of the cat tree/tower or pillow. Another additional feature that may be included in varying implementations of the tray (100) is an anti-slip material at the base of the top side of the tray portion (164) to prevent the bowls from moving. Another additional feature is straps from the sides of the pillow or cushion (114) extending to the bottom of the cat tower platform (116) for more security to keep the tray and cushion in place. Another additional feature is a weighted insert in the pillow or cushion (114) to prevent tipping of the tray.

Figure 4:
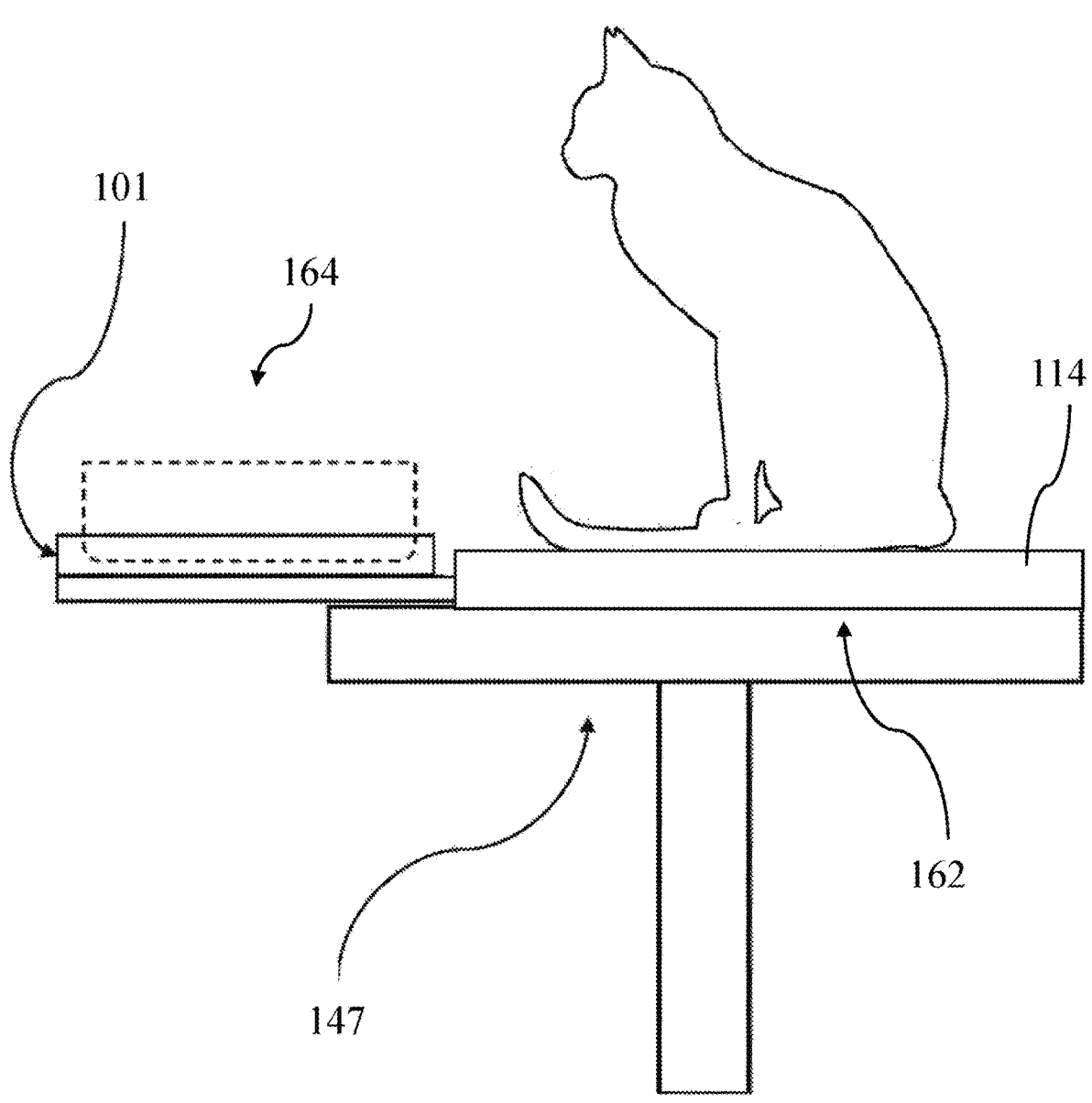
FIG. 4 is a side elevation view of the cat tower feeding tray attached to a cat tower platform.

Turning now to FIG. 4, that figure shows a schematic illustration of a side elevation view of the tray (100) of FIG. 3C attached to the platform (147) by the cushion (114). The drawing shows the feeding tray (100) attached to the platform (147) with a side view of the sidewall (101) of the first rectangular tray portion (164) of the feeding tray (100). By the dotted line, the drawing depicts where water and/or feeding bowls would be placed on the feeding tray, which is securely within the sidewall (101) of the feeding tray (100). The base portion (162) of the feeding tray (100) is attached to the cat tower platform (147) by insertion between the cushion (114) and the platform (147), as illustrated in FIGS. 3C and 3D. In the same manner, the tray (100) may be easily removed from the platform (147), while the hook and loop or other fasteners allow the cushion (114) to be easily removed and reattached as needed (e.g., for cleaning, transport to another tree, etc.), thereby the tray (100) is not permanently affixed to the cat tower. Alternatively, where the tray (100) is held on the platform (147) by its own weight and/or by the weight of a cat, the tray portion (164) of the feeding tray (100) that extends out over the edge of the cat tower platform (147) can have a minimal surface area, or may include widely spaced grating to prevent the cat from shifting the cat's weight and standing on the feeding tray portion (164) while still being able to support bowls for food and water.

Figure 5:
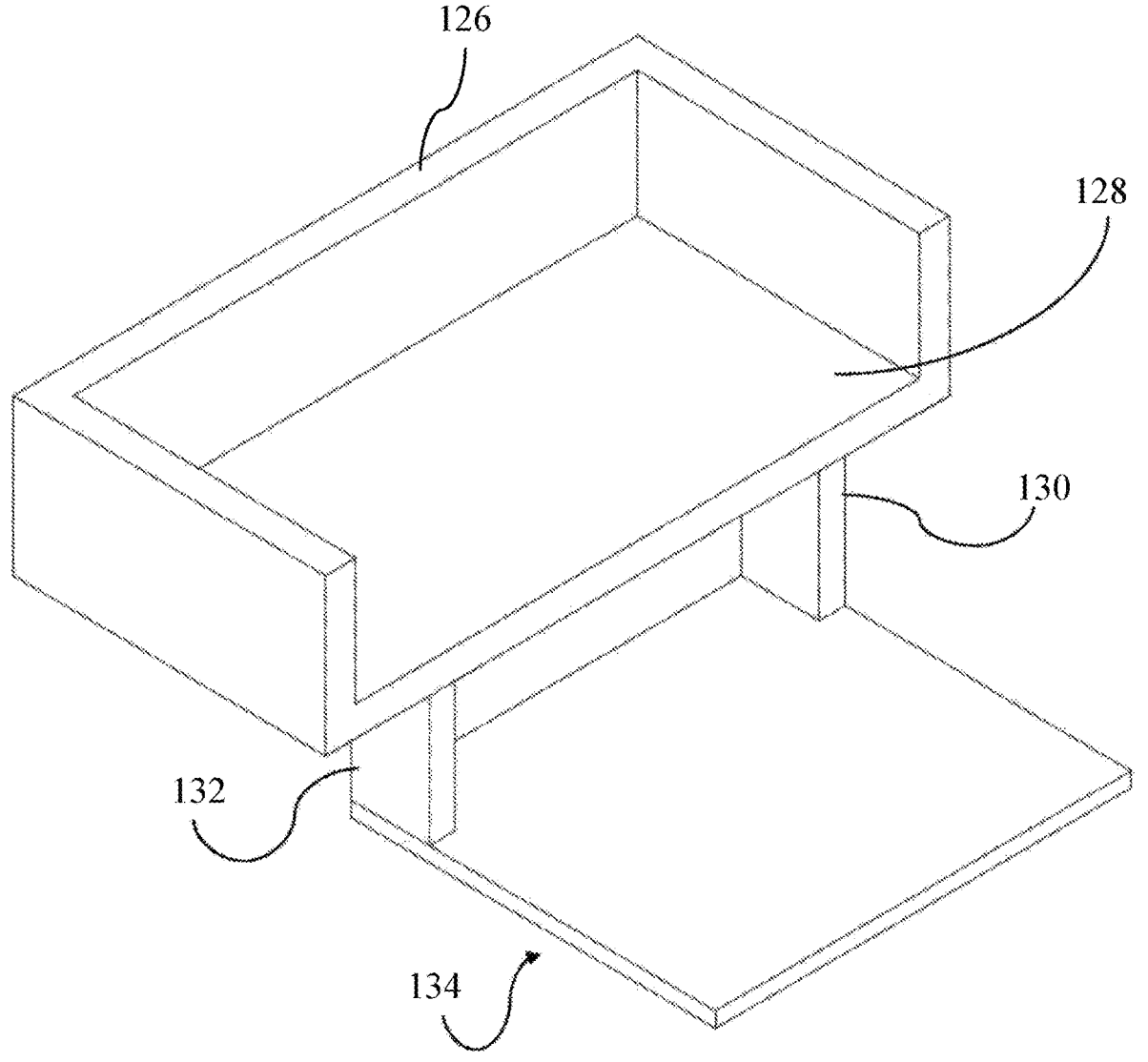
FIG. 5 is a top perspective view of an alternate version of a cat tower feeding tray with a raised tray portion.

FIG. 5 shows a drawing of an alternate version of a cat tower feeding tray from a top perspective view. A base portion (134) of a feeding tray is comprised of four sides. A raised tray portion (128) is comprised of four sides, three of which include a portion of the sidewall (126). On the bottom surface of the raised tray portion (128), on the side that does not contain the sidewall (126), there are two vertical risers (130, 132) that raise the raised tray portion (128) from one to three inches higher than the base portion (134) of the feeding tray. Raising the raised tray portion (128) may be accomplished with multiple risers (130, 132) as shown in the figure, or one riser that spans the width of the base portion (134). This alternate version of the feeding tray allows the feeding tray to be used on cat tower platforms that contain walls or raised edges that would prevent a flat feeding tray from being placed on such platform with raised edges or walls. The tray of FIG. 5 may also be used with a cat tower platform that does not include a raised edge or sidewall, as some cats prefer to have the surface from which they consume food or water elevated above the surface upon which the cat sits.

Figure 6:
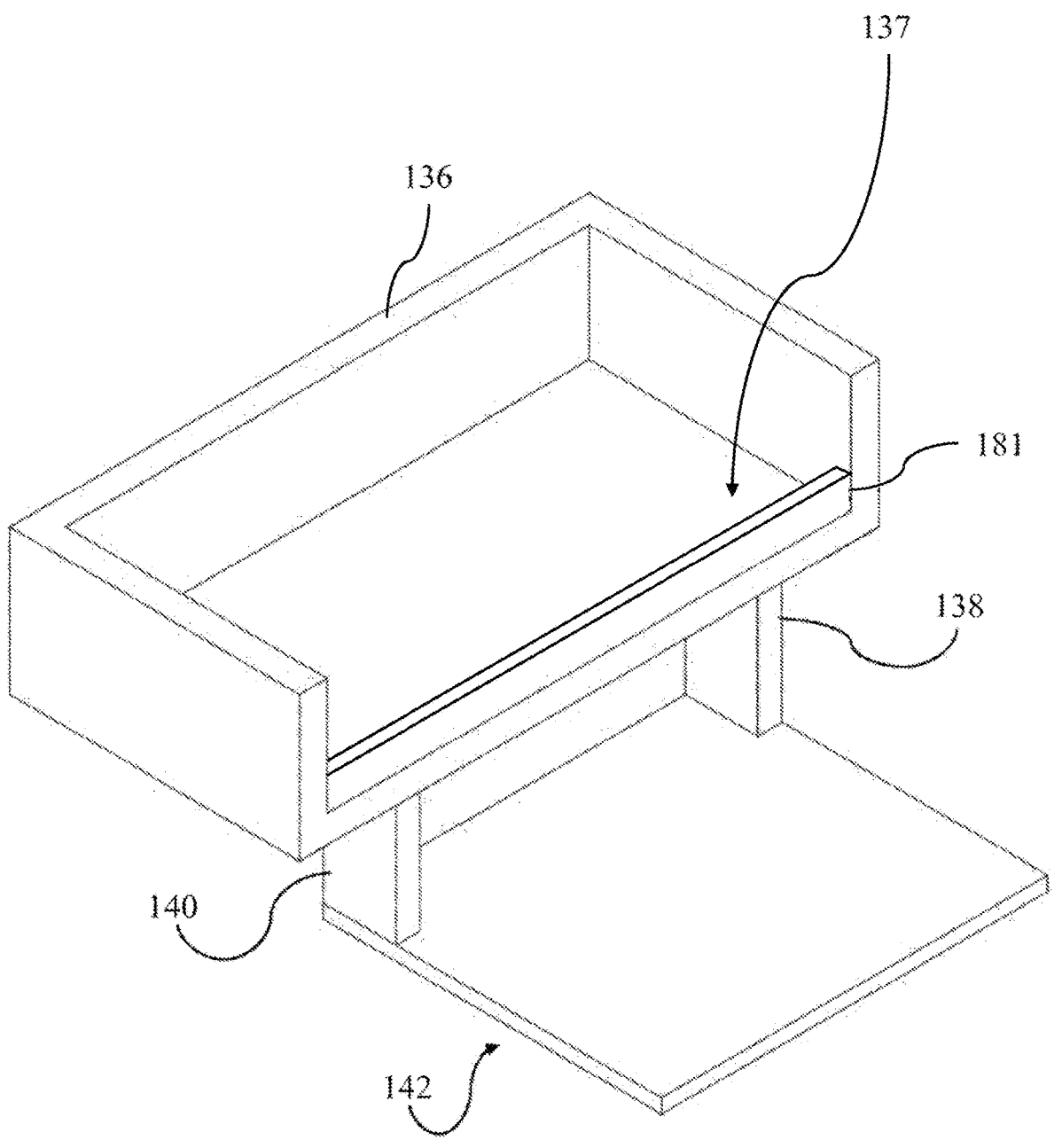
FIG. 6 is a top perspective view of an alternate version of a cat tower feeding tray with a raised tray portion and an additional lip on the front of the tray portion.

FIG. 6 shows a drawing of an alternate version of a cat tower feeding tray from a top perspective view. A base portion (142) of the feeding tray is comprised of four sides. A raised tray portion (137) of the feeding tray is comprised of four sides, three of which are attached to a sidewall (136). A fourth portion (181) of sidewall (136) is of a lower height than the other portions and runs along the front edge of the tray portion (137). The forth portion (181) of sidewall (136) has a height selected to allow a cat resting upon the base portion (142) to easily access food and drink placed on the tray portion (137), while preventing bowls and other objects from readily sliding off the tray portion (137) and spilling onto the base portion (142). On the bottom surface of the raised tray portion (137) of the feeding tray, the side that is not attached to the sidewall, there are two vertical risers (140, 138) that raise the raised tray portion (137) of the feeding tray from one to three inches higher than the base portion (142) of the feeding tray.

Figures 7A, 7B:
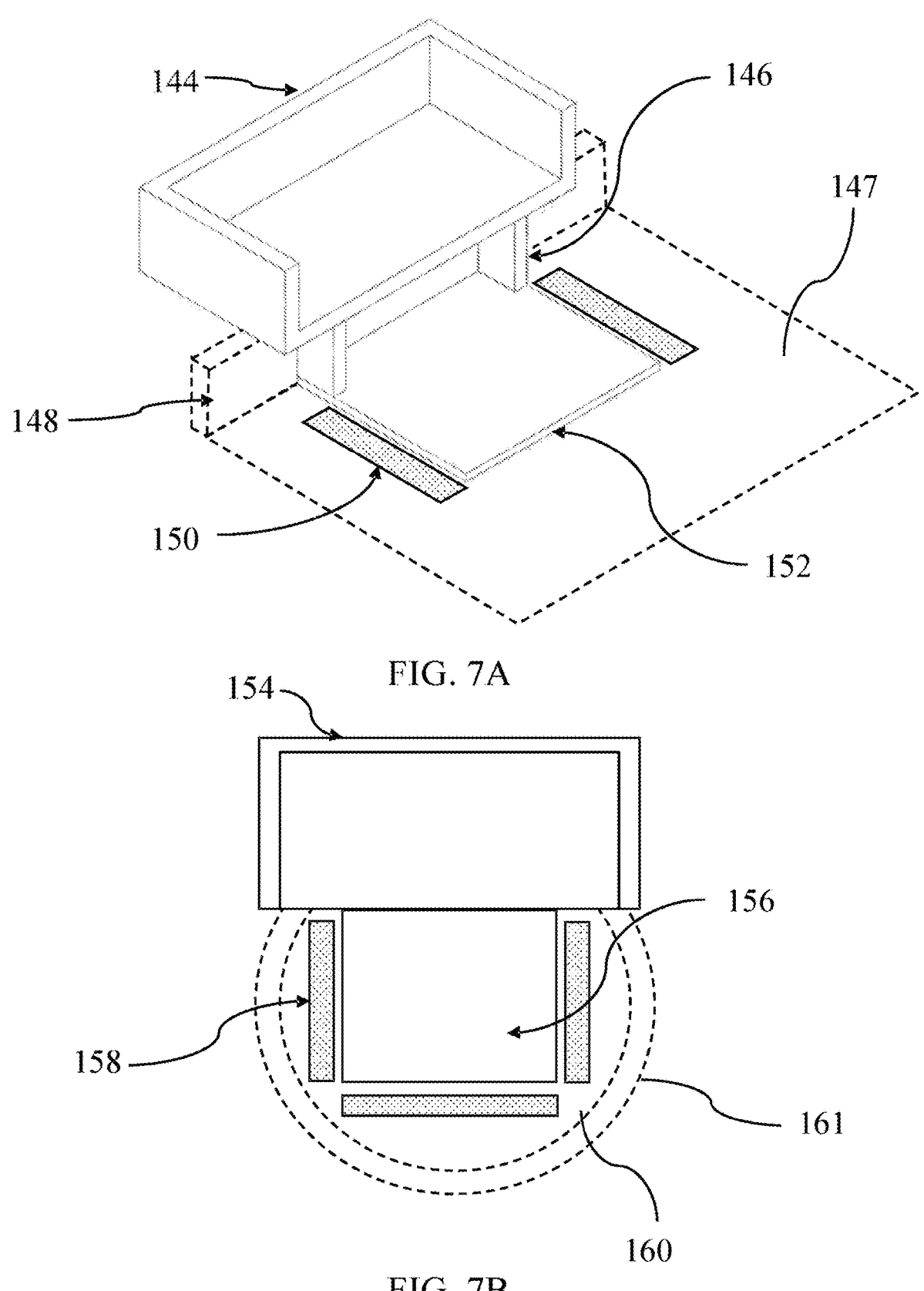
FIG. 7A is a top perspective view of the cat tower of FIG. 5 positioned on a rectangular cat tower platform with a raised edge.
FIG. 7B is a top-down view of the cat tower of FIG. 5 positioned on a circular cat tower platform with a raised edge.

FIG. 7A shows a drawing of tray of FIG. 5 from a top perspective view positioned on a platform of a cat tower (147), illustrated by dashed lines. One or more fasteners (150) are placed on a platform (147) of the cat tower/tree. These fasteners (150) allow a pillow or other attachment to be placed over the base portion (152) of the feeding tray (e.g., such as illustrated in FIGS. 3C and 3D. The risers (146) are of a height that raises the tray portion (144) above a sidewall (148) of the platform (147) (e.g., as compared to the flat tray of FIG. 1, which could not be inserted between the platform (147) and a cushion without contacting the sidewall (148)).

FIG. 7B shows a top perspective view of tray of FIG. 5 from a top-down view positioned on a circular platform (160) of a cat tower, illustrated by dashed lines. This version of the feeding tray is depicted placed on a round cat tower/tree platform (160) having a raised feeding tray portion, similar to the rectangular platform and lip shown in FIG. 7A. The platform (160) has three hook and loop fasteners (158) for securing a pillow or other attachment to hold the feeding tray on the platform (160). Other implementations of the feeding tray may have a base portion (156) that is the same shape as the platform of the cat tower/tree (160) (e.g., circular). As described above in the context of FIG. 7A, the tray portion (154) of the tray raises above a sidewall (161), allowing the raised tray to be used where a flat tray would contact and be unable to extend beyond the sidewall (161).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered and is understood not to be limited to the details of structure and operation shown and described in the specification and drawings.

The invention claimed is:

1. A feeding tray for use with an animal tower, comprising:
  (a) a tray portion, wherein the tray portion includes:
    (i) a flat, smooth surface configured to receive at least one dish; and
    (ii) a sidewall that at least partially surrounds the flat, smooth surface;
  (b) a base portion configured to engage a platform of the animal tower, wherein the tray portion extends outward beyond an edge of the platform when the base portion engages the platform; and
  (c) a cushion configured to cover at least a portion of the base portion, wherein the cushion has a width greater than a width of the base portion, and wherein the cushion engages one or more fasteners affixed to the platform to couple the base portion to the platform.

2. The feeding tray of claim 1, wherein the flat, smooth surface of the tray portion does not include holes or apertures.

3. The feeding tray of claim 1, wherein the tray portion and the base portion are a single, unibody structure.

4. The feeding tray of claim 1, wherein an opening is defined between the cushion and the platform when the cushion engages the one or more fasteners, and wherein the feeding tray is configured to slide in and out of the opening.

5. The feeding tray of claim 4, wherein the one or more fasteners include one or more of hook and loop fasteners, mechanical fasteners, double-sided adhesive tape, or combinations thereof.

6. The feeding tray of claim 1, wherein the flat, smooth surface of the tray portion is coated or covered with an anti-slip material.

7. The feeding tray of claim 1, further comprising one or more couplings disposed on a bottom surface of the base portion to couple the base portion to the platform.

8. The feeding tray of claim 1, further comprising one or more vertical risers configured to elevate the tray portion at a predetermined height above the base portion, wherein the vertical risers are coupled to both the base portion and the tray portion.

9. The feeding tray of claim 8, wherein the edge of the platform includes a platform sidewall having a predetermined height, wherein the tray portion extends outward over the platform sidewall, and wherein the predetermined height of the platform sidewall is less than the predetermined height at which the tray portion is elevated.

10. The feeding tray of claim 1, wherein the at least one dish is a bowl.

11. A feeding tray for use with an animal tower, comprising:
  (a) a tray portion configured to receive at least one bowl;
  (b) a base portion configured to engage a platform of the animal tower;
  (c) one or more vertical risers configured to elevate the tray portion above the base portion, wherein the one or more vertical risers are coupled to both the base portion and the tray portion; and
  (d) a cushion configured to cover at least a portion of the base portion, wherein the cushion has a width greater than a width of the base portion, and wherein the cushion engages one or more fasteners affixed to the platform to couple the base portion to the platform.

12. The feeding tray of claim 11, wherein the tray portion is elevated at a predetermined height above the base portion such that when the base portion engages the platform, the tray portion extends at least partially outward over an edge of the platform.

13. The feeding tray of claim 12, wherein the edge of the platform includes a platform sidewall having a predetermined height, wherein the tray portion extends at least partially outward over the platform sidewall, and wherein the predetermined height of the platform sidewall is less than the predetermined height at which the tray portion is elevated.

14. The feeding tray of claim 11, wherein the tray portion includes a flat, smooth surface that receives the at least one bowl, wherein the flat, smooth surface does not include holes or apertures.

15. The feeding tray of claim 14, wherein the flat, smooth surface of the tray portion is coated or covered with an anti-slip material.

16. The feeding tray of claim 14, wherein the tray portion includes:
  (a) a sidewall that at least partially surrounds the flat, smooth surface; and
  (b) a sidewall portion formed along a front edge of the tray portion.

17. The feeding tray of claim 16, wherein the sidewall portion has a predetermined height that is lower than a predetermined height of the sidewall.

18. The feeding tray of claim 11, wherein the one or more fasteners include one or more of hook and loop fasteners, mechanical fasteners, double-sided adhesive tape, or combinations thereof.

\* \* \* \* \*